United States Patent Office 2,875,199
Patented Feb. 24, 1959

2,875,199

LACTONES OF 17-CARBOXYALKYLATED ESTRA-1,3,5(10)-TRIENE-3,17-DIOLS AND 3-ETHERS

John A. Cella, Skokie, Ill., assignor to G. D. Searle & Co., Chicago, Ill., a corporation of Delaware No Drawing. Application April 22, 1958
Serial No. 730,061

6 Claims. (Cl. 260—239.57)

This invention relates to lactones of 17-carboxyalkylated estra-1,3,5(10)-triene-3,17-diols and 3-ethers, and processes for the manufacture thereof. More particularly, this invention relates to compounds of the formula

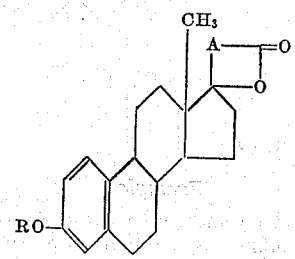

wherein R is hydrogen or a lower alkyl radical, and A is an ethylene, vinylene, propylene, or trimethylene radical.

Among the lower alkyl radicals comprehended by R in the foregoing formula are methyl, ethyl, propyl, isopropyl, butyl, isobutyl, sec-butyl, tert-butyl, pentyl, isopentyl, tert-pentyl, neopentyl, hexyl, isohexyl, heptyl, and like $C_nH_{2n+1}$ radicals wherein $n$ is a positive integer amounting to less than nine.

Equivalent to the depicted lactones for purposes of the present invention are the hydroxy acids in equilibrium therewith

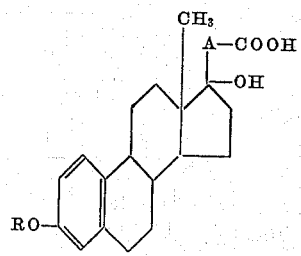

and the salts derived upon alkalization of the said lactones and/or hydroxy acids

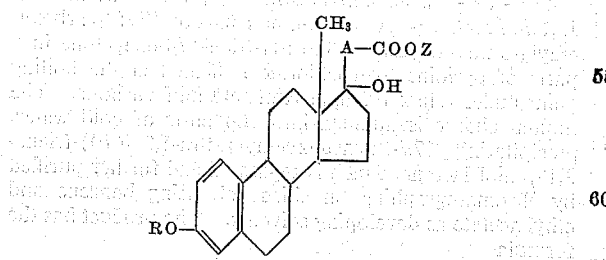

R and A in the latter two formulas having the meanings assigned above, and Z in the salt formula standing for an alkali metal or the ammonium radical.

The application for Letters Patent securing the invention herein described and claimed in a continuation-in-part of applicant's prior copending application, Serial No. 653,747, filed April 19, 1957, and now abandoned.

The subject compounds are useful because of their valuable pharmacological properties. They have, for example, the capacity to decrease the serum concentration of cholesterol and the corresponding cholesterol/phospholipid ratio, without at the same time producing the potent estrogenic side-effects characteristic of prior art compositions adapted to regulation of cholesterol metabolism.

Manufacture of the components of the present invention proceeds generally as follows: an appropriate 17α-alkynylestradiol 3-methyl ether is carboxylated by seriatim treatment with the Grignard reagent and carbon dioxide in ethereal solution to give the corresponding acid

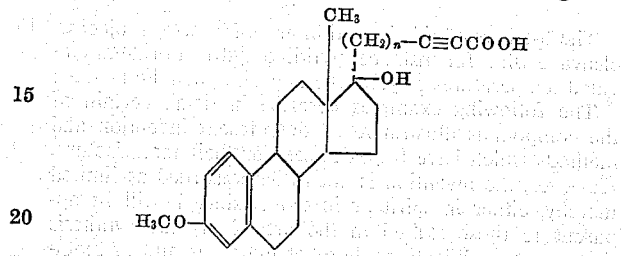

$n$ being 0 or 1 (as dictated by the alkenyl substituent in the starting material), this acid in turn being selectively hydrogenated in the presence of a catalyst of the order of activity of palladium supported by an insoluble metal carbonate, to produce the alkenyl hydroxy acid

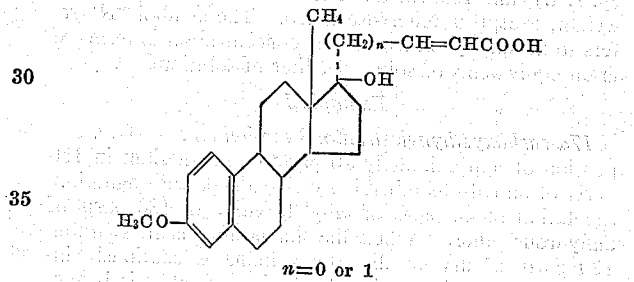

$n=0$ or 1 which, on sufficiently prolonged contact with a proton source, cyclizes to the lactone

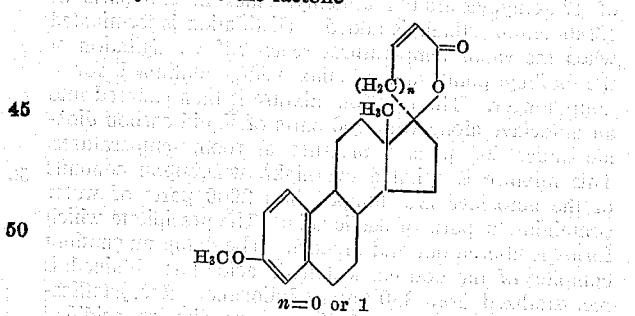

$n=0$ or 1

Further reduction, using a more active catalyst—for example, palladium on charcoal—affords the corresponding saturated hydroxy acid or lactone, depending upon the acidity of the medium and the time of contact.

As an exception to the foregoing manufacturing process, the following procedure affords the carboxypropylene products hereof: an appropriate 17α-butenylestradiol 3-methyl ether is reduced with sodium borohydride in the presence of aluminum chloride to the borane

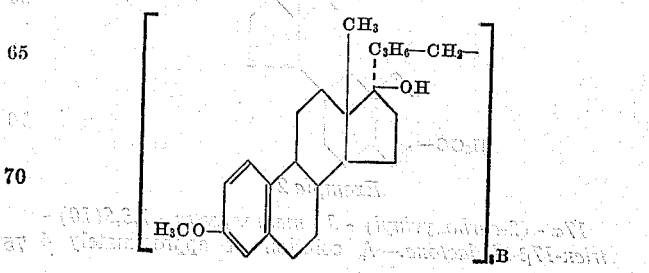

which, on seriatim oxidation with aqueous alkaline peroxide and chromium trioxide in a ketonic medium, yields the lactone

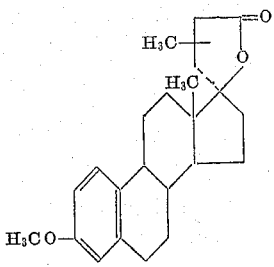

The 3-ethers of this invention are, of course, subject to cleavage with, for instance, pyridine hydrochloride at elevated temperatures to yield the apposite phenolic lactone.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in pounds per square inch (p. s. i.), and relative amounts of materials in parts by weight, except as otherwise noted. The symbol "N" refers to normality, which defines concentration in terms of gram equivalents of solute per liter of solution.

*Example 1*

*17α-carboxyethynylestradiol 3-methyl ether.*—To a suspension of approximately 10 parts of magnesium in 180 parts of anhydrous ether is slowly added, with agitation, a solution of 44 parts of ethyl bromide in 180 parts of anhydrous ether. When the magnesium is in solution, 120 parts of dry 1,2-dimethoxyethane is cautiously introduced, following which distillation of ether is begun. Simultaneously with distillation, a solution of 20 parts of 17α-ethynylestradiol 3-methyl ether in 250 parts of 1,2-dimethoxyethane is added. Distillation is terminated when the vapor temperatures reach 70° C., agitation at the boiling point under reflux being continued for 4 hours longer. The reaction mixture is then charged into an autoclave along with 200 parts of liquid carbon dioxide under 600 p. s. i. pressure at room temperatures. This mixture is agitated overnight, whereupon contents of the autoclave are dumped into 2000 parts of water containing 20 parts of acetic acid. The precipitate which forms is filtered out and pressed. The damp magnesium complex of the desired acetylenic acid thus obtained is recrystallized from 350 parts of dioxane. Recrystallization from 125 parts of 50% aqueous dioxane acidified to pH 4 with muriatic acid serves to cleave the complex and afford 17α-carboxyethynylestradiol 3-methyl ether monohydrate, melting at 200–204° C. (dec.). Water of crystallization is lost on heating at 120–140° C. The anhydrous product has the formula

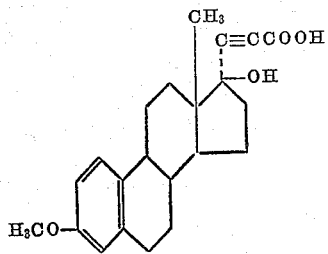

*Example 2*

*17α - (2-carboxyvinyl) - 3 - methoxyestra - 1,3,5(10) - trien-17β-ol lactone.*—A solution of approximately 4 parts of 17α-carboxyethynylestradiol 3-methyl ether in 90 parts of dioxane containing 9 parts of pyridine is agitated with hydrogen at room temperatures and atmospheric pressures in the presence of approximately 1 part of 5% palladium supported on calcium carbonate. When one equivalent of hydrogen has been absorbed, the reduction is stopped and the reaction mixture thereupon filtered to remove catalyst. The bulk of the solvent is stripped in vacuo, and the oily residue is then treated with 40 parts of aqueous 10% muriatic acid to induce crystallation. The solid product thus obtained is filtered off and then crystallized from approximately 20 parts of ethyl acetate. The 17α-(2-carboxyvinyl)-3-methoxyestra-1,3,5-(10)-trien-17β-ol lactone thus obtained melts at approximately 170–172° C. and has the formula

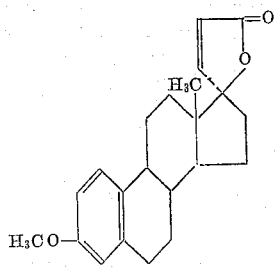

*Example 3*

*17α - (2 - carboxyethyl) - 3 - methoxyestra - 1,3,5(10)-trien-17β-ol lactone.*—A solution of 3 parts of 17α-(2-carboxyvinyl)-3-methoxyestra-1,3,5(10)-trien-17β-ol lactone in 120 parts of ethyl acetate is hydrogenated at atmospheric pressures and room temperatures in the presence of 1 part of 5% palladium supported on carbon powder. When one equivalent of hydrogen has been absorbed, reduction ceases; and the reaction mixture is then filtered to remove the catalyst. The filtrate is evaporated to dryness, following which the residue is crystallized from 5 parts of an equi-volume mixture of isopropyl ether and ethyl acetate. The 17α-(2-carboxyethyl)-3-methoxyestra-1,3,5(10)-trien-17β-ol lactone thus obtained melts at 150–152° C. The product has the formula

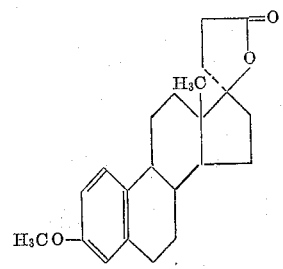

*Example 4*

*17α - (2 - carboxyethyl)estra - 1,3,5(10) - triene - 3,-17β-diol lactone.*—A solution of 1 part of 17α(2-carboxyethyl)-3-methoxyestra-1,3,5(10)-trien-17β-ol lactone in 5 parts of pyridine hydrochloride is heated at the boiling point under reflux for approximately half an hour. The molten charge is dumped into 100 parts of cold water, precipitating 17α-(2-carboxyethyl)estra-1,3,5(10)-triene-3,17β-diol lactone, which is separated and further purified by chromatographing on silica gel, using benzene and ethyl acetate as developing solvents. The product has the formula

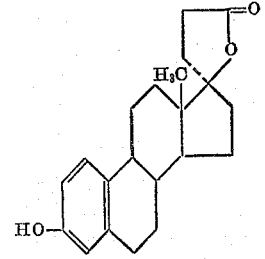

Example 5

*17α - (2 - propynyl)estradiol 3 - methyl ether.*—A mixture of 6 parts of 20-mesh clean-surfaced zinc, 10 parts of estrone 3-methyl ether, and 10 parts of propargyl bromide in 105 parts of tetrahydrofuran is heated at the boiling point of the solvent under reflux for approximately 2 hours. The liquid phase is then decanted onto 1000 parts of ice-water containing 10 parts of glacial acetic acid. The gummy crude which is thrown down is isolated by decantation and then suspended in 105 parts of boiling methanol. After chilling, the mixture is filtered free of insoluble material and the filtrate stripped of solvent by vacuum distillation. The residue is taken up in 60 parts of absolute ethanol, and to this solution is added 4 parts of trimethylaminoacetohydrazide chloride and 4 parts of glacial acetic acid. The resultant solution is heated at the boiling point for 30 minutes, then dumped into 300 parts of water containing 6 parts of sodium bicarbonate. The solid which precipitates is 17α-2-propynyl)estradiol 3-methyl ether which, recrystallized from 60 parts of methanol, melts in the range 49–60° C. The product has the formula

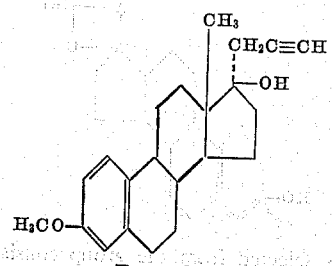

Example 6

*17α-(3-carboxy-2-propynyl)estradiol 3-methyl ether.*—A solution of 11 parts of methylmagnesium bromide in 95 parts of anhydrous ether is diluted with 45 parts of tetrahydrofuran and distilled until the vapor temperature reaches 55° C. At this point, approximately 6 parts of 17α-(2-propynyl)estradiol 3-methyl ether dissolved in 70 parts of tetrahydrofuran is introduced; and the reaction mixture is heated at the boiling point under reflux, with agitation, for 20 hours. The mixture is then cooled to room tempreatures and vigorously agitated under a carbon dioxide atmosphere for 24 hours. Finally the mixture is dumped into 1000 parts of ice-water containing 15 parts of concentrated sulfuric acid. The solid precipitate thrown down is recovered by filtration, washed with water, and air-dried at 80° C. Further purification is achieved by washing with 65 parts of boiling carbon tetrachloride. The product thus obtained is 17α-(3-carboxy-2-propynyl)estradiol 3-methyl ether, which melts in the range 184–193° C. with decomposition). The product has the formula

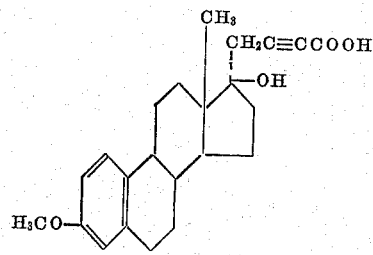

Example 7

A. *17α(3 - carboxypropyl) - 3 - methoxyestra - 1,3,5-(10)-trien-17β-ol.*—A solution of approximately 7 parts of 7α-(3-carboxy-2-propynyl)estradiol 3-methyl ether in a mixture of 105 parts of absolute ethanol and 2 parts of triethylamine is vigorously agitated in an atmosphere of hydrogen at room temperatures under pressures of the order of 24 p. s. i., there being 1 part of 5% palladium on charcoal present as catalyst. When hydrogen uptake is complete, the catalyst is removed by filtration; and the filtrate is concentrated to approximately one-fifth volume, then dumped into 200 parts of water containing 6 parts of concentrated muriatic acid. The white solid thrown down is rapidly recovered on a filter, washed thereon with water, dried, and recrystallized from ethyl acetate. The 17α - (3 - carboxypropyl) - 3 - methoxyestra - 1,3,5-(10)-trien-17β-ol thus obtained melts at 164–168.5° C. (with decomposition).

B. *17α - (3 - carboxypropyl) - 3 - methoxyestra - 1,3,-5(10)-trien-17β-ol lactone.*—A solution of approximately 31 parts of 17α-(3-carboxypropyl)-3-methoxyestra-1,3,5-(10)-trien-17β-ol in 640 parts of absolute ethanol is mixed with 36 parts of water and 54 parts of concentrated muriatic acid. The reactants are let stand for 2 hours at room temperatures, then dumped into 10,000 parts of water. The resultant mixture is extracted with ether; and the ether extract is washed with water, dried over anhydrous sodium sulfate, and stripped of solvent by vacuum distillation. The gummy residue is dissolved in 4000 parts of benzene, and this solution is mixed with 1 part of p-toluenesulfonic acid monohydrate. The resultant mixture is concentrated to one-fifth its original volume by distillation, whereupon the concentrate is washed with water and dried over anhydrous sodium sulfate. The solution thus obtained is stripped of solvent by vacuum distillation, and the residue is recrystallized from ethyl acetate. There is produced by this means 17α-(3-carboxypropyl - 3 - methoxyestra - 1,3,5(10) - trien - 17β - ol lactone which, dried in vacuo at 100° C., melts at 168–170° C. The product has the formula

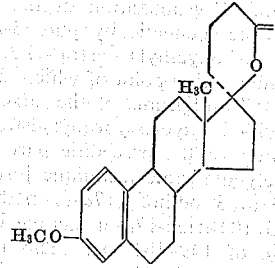

Example 8

A. *3 - methoxy - 17α - (1 - methyl - 3 - hydroxypropyl)estra - 1,3,5(10) - trien - 17β - ol.*—Estrone 3 - methyl ether and crotyl-magnesium bromide are reacted according to the procedure described for the preparation of 17α-allylestradiol 3-methyl ether by Colton et al., J. Am. Chem. Soc. 79, 1123 (1957). To a solution of 14 parts of the resulting 17α-(1-methylallyl)estradiol 3-methyl ether in 72 parts of β,β'-dimethoxydiethyl ether is added a solution of 13 parts of sodium borohydride and 13 parts of aluminum chloride in 540 parts of β,β'-dimethoxydiethyl ether. The reactants are agitated at room temperatures overnight, then heated at 70–85° C. for 3 hours with continued agitation. The resultant suspension is cooled, whereupon an excess of muriatic acid is carefully added. Upon extraction with benzene and removal of solvent from the benzene extract, the borane intermediate hereinbefore referred to is obtained as a gummy residue. This residue is taken up in 320 parts of ethanol, and to the ethanol solution is added 40 parts of aqueous 30% hydrogen peroxide and 120 parts of aqueous 10% caustic soda. When the resultant exothermic reaction subsides, the mixture is heated at 95–100° C. until the peroxide is destroyed, whereupon this alkaline peroxide treatment is twice repeated and heating at 95–100° C. continued under a nitrogen atmosphere until most of the ethanol is evaporated. The residue, diluted with water and chilled, solidifies. Pressed dry on a filter and washed with water, the resultant 3-methoxy - 17α - (1 - methyl - 3 - hydroxypropyl)estra-1,3,5(10)-trien-17β-ol consists of a mixture of isomers which are resolved by trituration with ether. The insoluble isomer, recovered on a filter, melts at approximately 150.5–153° C.

From the mother liquors, by chromatographic adsorption on silica gel, using benzene and ethyl acetate as developing solvents, the second isomer is obtained. Its melting point is 157–159° C. The products have the formula

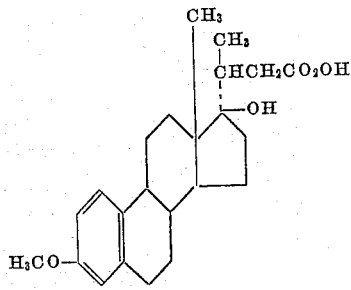

B. *3 - methoxy - 17α - (1 - methyl - 2 - carboxyethyl)- estra - 1,3,5(10) - trien - 17β - ol lactone.*—To a solution of 380 milligrams of the 3 - methoxy - 17α - (1 - methyl- 3 - hydroxypropyl) - estra - 1,3,5(10) - trien - 17β - ol isomer melting at 150.5–153° C. in 20 milliliters of acetone is added, at room temperatures, 0.56 milliliter of 8 N chromic acid in 8 N sulfuric acid. The reactants are diluted with water, and the resultant mixture is extracted with a mixture of benzene and ether. The extract is washed with aqueous potassium bicarbonate, dried over anhydrous sodium sulfate, and stripped of solvent by distillation in vacuo. Crystallization of the residue from butanone affords stereochemically pure 3-methoxy-17α- (1 - methyl - 2 - carboxyethyl) - estra - 1,3,5(10) - trien- 17β-ol lactone, the melting point of which is 168–170° C.

Oxidation of 842 milligrams of the mixed 3-methoxy- 17α - (1 - methyl - 3 - hydroxypropyl)estra - 1,3,5(10)- trien-17β-ol isomers of the preceding part A of this example by precisely the same technique just set forth affords a mixture of 3-methoxy-17α-(1-methyl-2-carboxyethyl)-estra-1,3,5(10)-trien-17β-ol lactone isomers, melting in the range of 149–161° C. This mixture is resolved by chromatographic adsorption on silica gel, using benzene and ethyl acetate as developing solvents. There is obtained by this means sterochemically pure 3-methoxy - 17α - (1 - methyl - 2 - carboxyethyl) - estra- 1,3,5(10)-trien-17β-ol lactone melting at 184–187° C.

The products have the formula

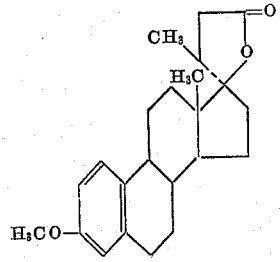

Substitution of 17α - (2 - methylallyl estradiol 3 - methyl ether for the 1-methylallyl isomer used as a starting material in this example affords, in accordance with the technique herein detailed, 3 - methoxy - 17α - (2 - methyl - 2 - carboxyethyl) - estra - 1,3,5(10) - trien - 17β - ol lactone, having the formula

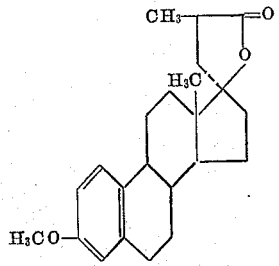

What is claimed is:
1. A compound of the formula

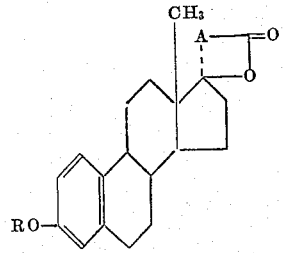

wherein R is selected from the group consisting of hydrogen and lower alkyl radicals, and A is selected from the group consisting of ethylene, vinylene, propylene, and trimethylene radicals.

2. 17α - (2 - carboxyvinyl) - 3 - methoxyestra - 1,3,5(10) - trien - 17β - ol lactone.

3. 17α - (2 - carboxyethyl) - 3 - methoxyestra - 1,3,5(10) - trien - 17β - ol lactone.

4. 17α - (2 - carboxyethyl)estra - 1,3,5(10) - triene - 3,17β - diol lactone.

5. 17α - (3 - carboxypropyl) - 3 - methoxyestra - 1,3,5(10) - trien - 17β - ol lactone.

6. 3 - methoxy - 17α - (1 - methyl - 2 - carboxyethyl) estra - 1,3,5(10) - trien - 17β - ol lactone.

No references cited.